United States Patent

Dissmeyer et al.

[15] 3,650,417
[45] Mar. 21, 1972

[54] ENTRY TOOL FOR UNLOADING MECHANISM

[72] Inventors: Fred W. Dissmeyer, Elgin; George E. Olson, Arlington Heights, both of Ill.

[73] Assignee: A. O. Smith Harvestore Products, Inc., Arlington Heights, Ill.

[22] Filed: Apr. 15, 1970

[21] Appl. No.: 28,850

[52] U.S. Cl. ..................................................214/17 DA
[51] Int. Cl. ..........................................................B65g 65/42
[58] Field of Search ...............................................214/17 DA

[56] References Cited

UNITED STATES PATENTS

| | | | |
|---|---|---|---|
| 3,434,605 | 3/1969 | Yung | 214/17 DA |
| 3,151,749 | 10/1964 | Long | 214/17 DA |
| 3,232,457 | 2/1966 | Bernstein et al. | 214/17 DA |
| 3,403,795 | 10/1968 | Schaefer | 214/17 DA |

*Primary Examiner*—Robert G. Sheridan
*Attorney*—Andrus, Sceales, Starke & Sawall

[57] ABSTRACT

An entry tool incorporated with an unloading mechanism for unloading stored material from a sealed storage structure. The storage structure is supported on a foundation having a radially extending trough extending from the center of the structure to the exterior and conveyor members are located in spaced parallel relation within the trough, while a stationary backbone or frame of a separate cutter arm assembly is located within the trough between the conveyor members. An entry tool is associated with a center post assembly at the inner end of the backbone, and as the cutter arm assembly is installed in the structure, the entry tool dislodges the stored material located within the trough between the conveyor members and throws the dislodged material laterally outward to the conveyors so that the cutter arm assembly can be installed within the trough.

12 Claims, 11 Drawing Figures

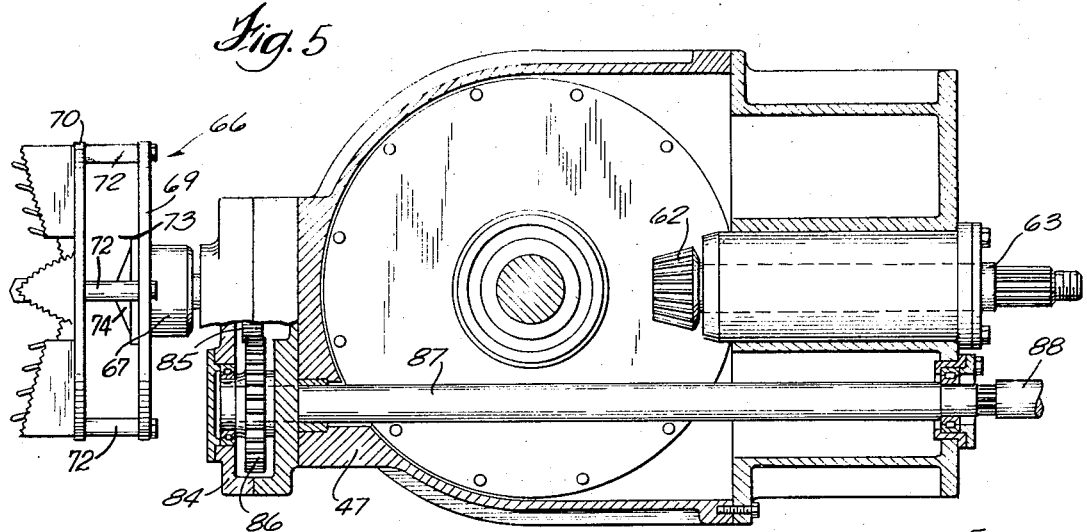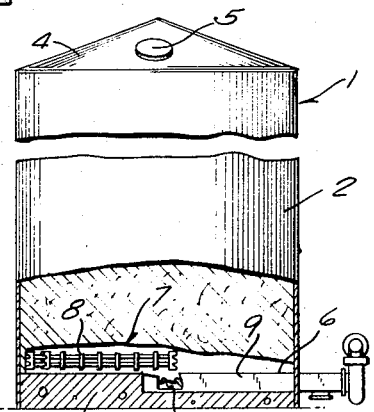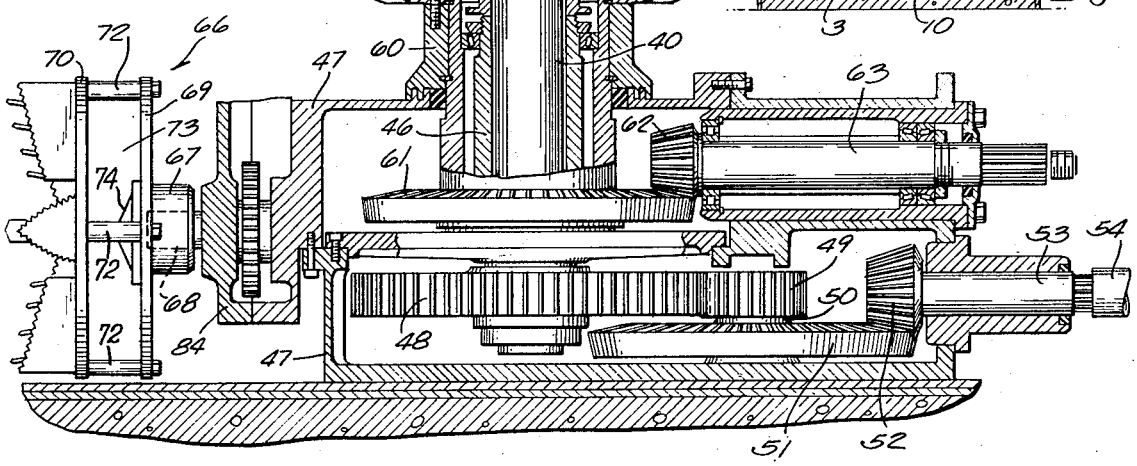

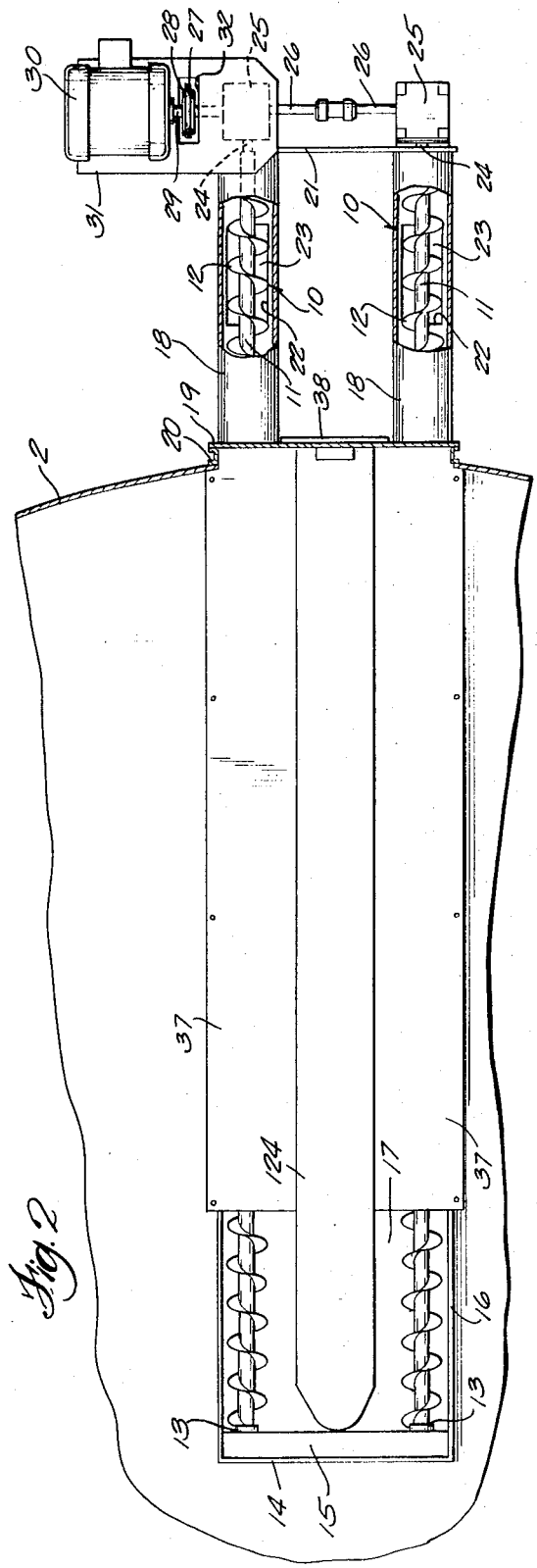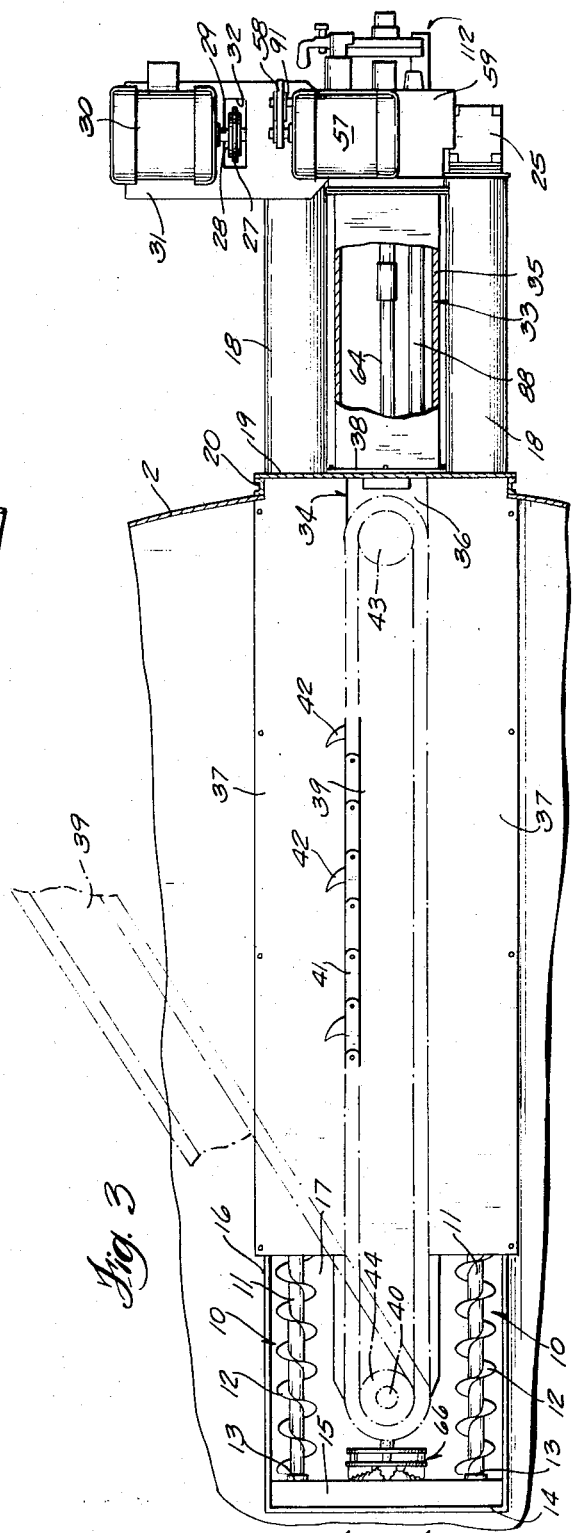

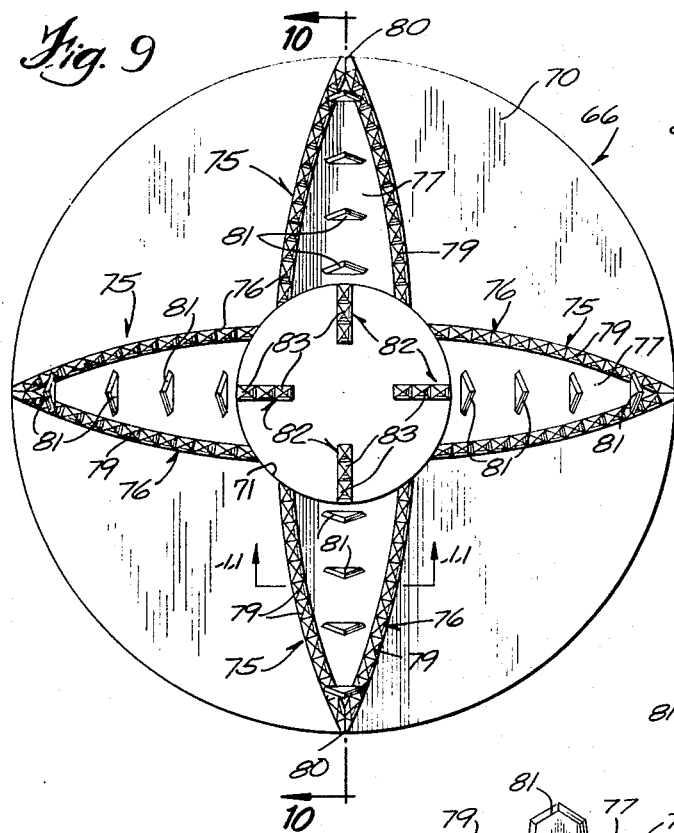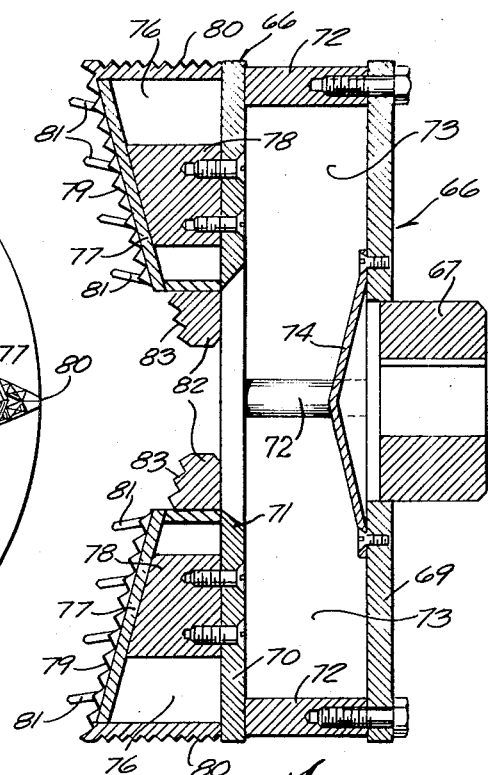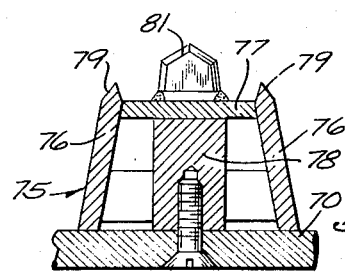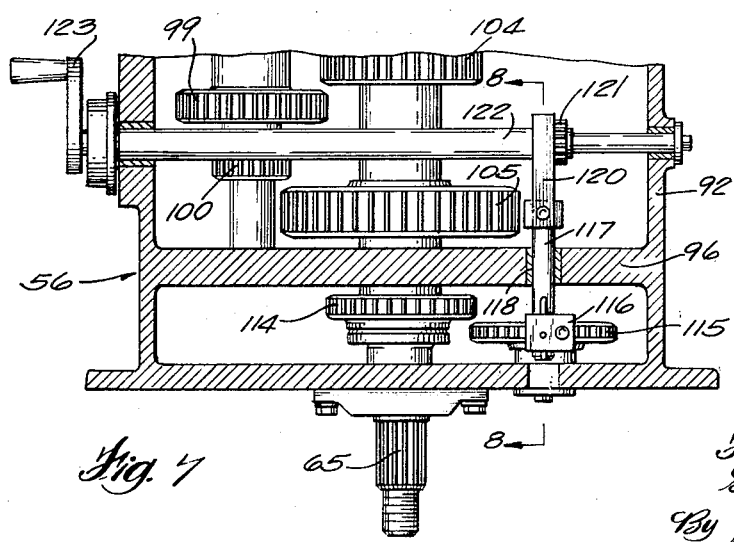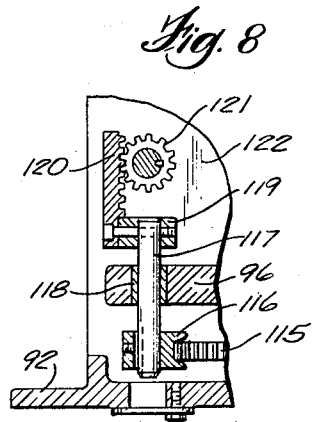

ENTRY TOOL FOR UNLOADING MECHANISM

This invention relates to a mechanism for unloading stored material from a storage structure, and more particularly to an entry tool associated with the unloading structure for facilitating the installation of the cutter arm assembly of the unloading mechanism in the structure.

Copending United States patent application serial No. 872,814, filed Oct. 31, 1969, entitled Unloading Mechanism For A Sealed Storage Structure, relates to an unloading mechanism for use with a sealed storage structure and includes a conveyor unit and a cutter arm assembly which are separate and independently driven. In the unloading mechanism described in the aforementioned patent application, the conveyor unit includes a pair of auger conveyors which are located in spaced parallel relation within the radially extending trough in the foundation. The cutter arm assembly can be independently installed within the structure and includes a central frame or backbone located between the augers, and a cutter arm is mounted for rotation on a center post at the inner end of the backbone and carries an endless cutter chain that serves to dislodge the stored material and discharge the material into the central portion of the trough where the material is conveyed by the augers to the exterior. With the unloading mechanism as disclosed in the above patent application, the cutter arm assembly is normally not installed in the unloader when unloading free flowing material, until the major portion of the material has been removed and the remaining portion of the material has reached its angle of repose. The cutter arm assembly is then installed in the structure and the cutter arm acts to sweep the remaining material into the trough for discharge by the auger conveyors.

The present invention is directed to an improvement to the unloading mechanism disclosed in the aforementioned patent application and includes a rotatable entry tool which is located on the center post at the inner end of the backbone of the cutter arm assembly and aids in dislodging the stored material located within the trough to thereby faciliate the installation of the cutter arm assembly in the structure. More specifically, the entry tool includes an inner vertical support plate attached to a rotatable shaft, and an annular plate having a central opening is spaced outwardly of the inner plate to provide a chamber between the plates. A series of serrated cutting teeth are mounted on the outer surface of the annular outer plate and as the tool is rotated the cutting teeth engage and dislodge the material in the trough, with a portion of the material being thrown outwardly by the teeth toward the auger conveyors, while a second portion of the material is delivered through the central opening in the outer plate and is then thrown outwardly by centrifugal force within the chamber to the auger conveyors.

The entry tool serves to clear the central portion of the trough between the augers of the stored material so that the cutter arm assembly can be moved into position in the trough.

The drive mechanism for the entry tool extends through the backbone of the cutter arm assembly, and a provision is made to independently operate the entry tool so that operation of the tool can be terminated once the cutter arm assembly has been properly installed within the storage structure.

Other objects and advantages will appear in the course of the following descriptions.

The drawings illustrate the best mode presently contemplated of carrying out the invention.

In the drawings:

FIG. 1 is a vertical section of a sealed storage structure incorporating the unloading mechanism of the invention;

FIG. 2 is a horizontal section showing the conveying unit but without the cutter arm assembly installed within the structure;

FIG. 3 is a view similar to FIG. 2 but with the cutter arm assembly installed in the structure;

FIG. 4 is an enlarged vertical section of the center post assembly of the cutter arm assembly;

FIG. 5 is a horizontal section of the center post assembly;

FIG. 7 is a partial horizontal section through the transmission and shows details of the mechanism for engaging the entry tool drive;

FIG. 8 is a section taken along line 8—8 of FIG. 7;

FIG. 9 is a front elevation of the entry tool;

FIG. 10 is a section taken along line 10—10 of FIG. 9; and

FIG. 11 is a section taken along line 11—11 of FIG. 9.

Figure 6:
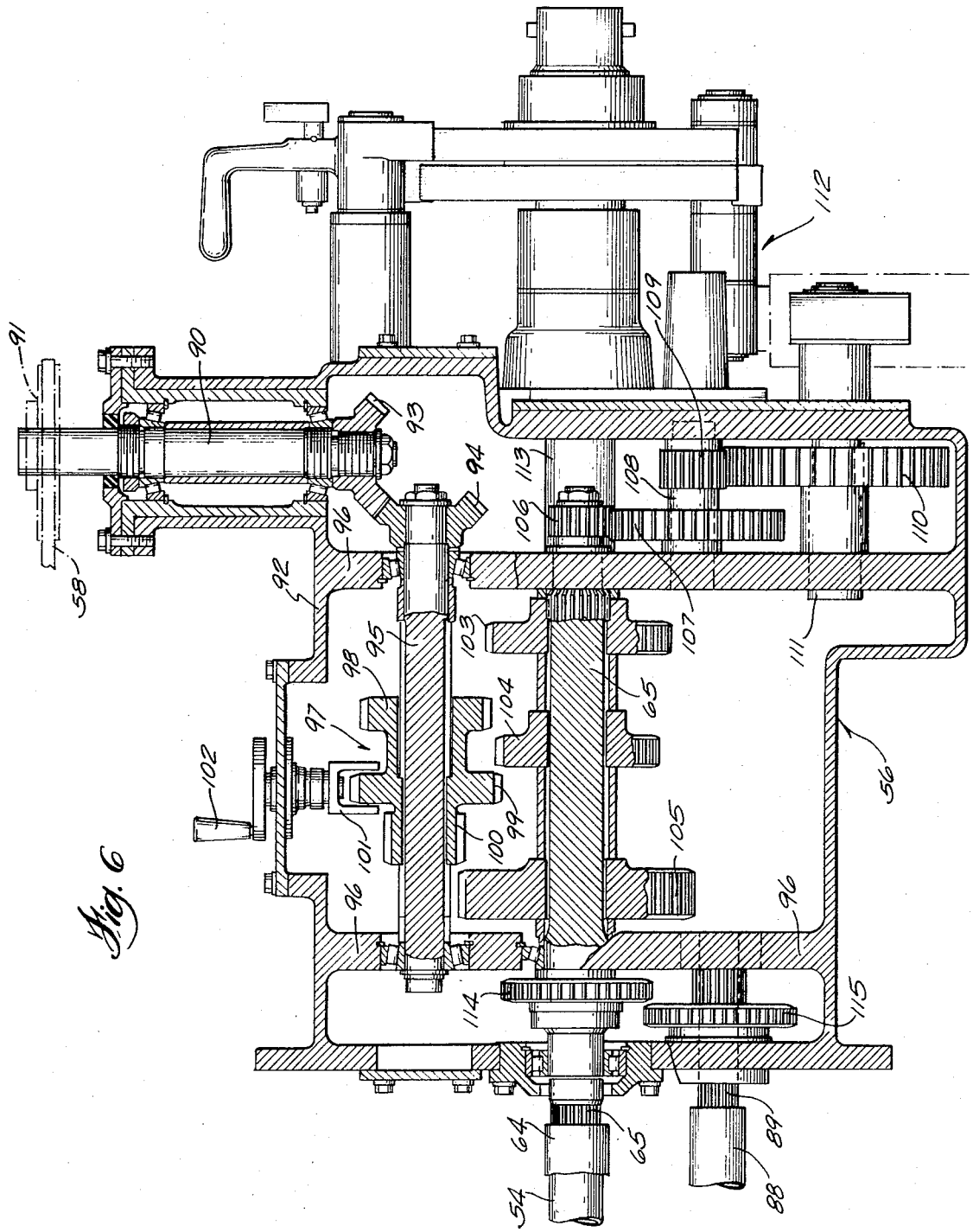
FIG. 6 is a horizontal section showing certain details of the transmission.

The drawings illustrate a sealed storage structure or silo 1, which is adapted to contain stored material, such as corn silage, grass silage, shelled corn, chopped ear corn, soy meal, sugar flour, or the like. The storage structure 1 includes a generally cylindrical wall 2 which is supported on a foundation 3. The upper end of the cylindrical wall 2 is enclosed by a roof 4, and the stored material is loaded into the storage structure through an opening in the roof 4 which is normally enclosed by a sealed cover 5.

A radially extending trough 6 is formed in the upper surface of the foundation 3. An unloading mechanism 7 is utilized to remove the stored material from the storage structure and includes a cutter arm assembly 8 and a conveying unit 9 which is located within the trough 6.

The conveying unit 9 includes a pair of augers 10 which are located within the trough 6 and are positioned adjacent the side edges of the trough. Each of the augers 10 includes a horizontal shaft 11 which carries a spiral flight 12. The inner end of each shaft 11 is journaled within a bearing assembly 13 mounted on end plate 14 disposed at the inner end of the trough 6. To prevent the stored materials from contacting the bearing assemblies 13 a shield 15 is connected to the upper edge of end plate 14 and extends over the bearing assemblies 13.

A generally U-shaped trough housing 16 is secured to the walls of the foundation which define the trough 6 and includes a base plate 17. The augers 10 are spaced a slight distance above the base plate 17 and the side edges of the base plate 17 are provided with diagonally extending surfaces against which the augers convey the stored material as it is being moved to the exterior of the storage structure.

The outer ends of the augers 10 extend through an opening in the wall 2 of the storage structure and are housed in generally cylindrical housings 18. A plate 19 connects the inner ends of the housings 18 and is bolted to the door frame 20 which borders the door or opening in the wall 2 of the storage structure. A similar plate 21 connects the outer ends of the auger housing 18 together.

The stored material which is conveyed outwardly by the augers 10 is discharged from the housings 18 through openings 22 formed in the lower portions of the housings. The openings are enclosed by removable doors 23. During the unloading operation the doors 23 are removed so that the stored material can be discharged, while during nonoperation the doors are sealed to the frame bordering the openings 22 in order to retain the airtight characteristics of the storage structure.

To drive the augers 10, the outer end of each auger shaft 11 is connected to an output shaft 24 of a spur gearworm drive unit 25. The drive units 25 have a common input shaft 26 which carries a pulley that is connected by a belt 27 to a pulley 28 secured to motor drive shaft 29 of motor 30. Motor 30 is mounted on a platform 31 connected to the plate 21. Platform 31 is provided with an opening 32 and the belt drive of the motor 30 acts through the drive units 25 to rotate both of the augers 10 in a direction to convey the stored material through the trough 6 to the housings 18 where it is discharged through the openings 22.

The cutter arm assembly 8 is an independent unit and can be installed and withdrawn separately from the conveyor unit 9. The cutter arm assembly 8 includes a generally rectangular frame or backbone 33 which is located between the augers 10, as shown in FIG. 3. Backbone 33 includes an inner section 34 which is disposed within the storage structure and an outer section 35 that is located between the housings 18 on the exterior of the structure. The upper surface 36 of the inner backbone section 34 is located between the transversely spaced floor plates 37 that are secured to the foundation 3, and in combination with the floor plates 37, provides a generally smooth planar surface over which the cutter arm travels.

To secure the frame 33 to the conveyor unit 9 flange 38 is secured to the outer section 35 and is bolted flatwise against the plate 19 on conveyor unit 9. The plates 19 and 21 have a generally U-shaped configuration with a central recess within which the backbone 33 of the cutter arm assembly is received.

In addition to backbone 33 the cutter arm assembly 8 also includes a rotatable cutter arm 39 which is journaled around a central vertical shaft 40. Cutter arm 39 carries an endless chain 41 having a series of cutter teeth 42 that act to slice and dislodge the stored material as the chain 41 rotates in endless travel on the cutter arm 39. The cutter arm 39 and chain 41 can be similar in construction to that shown in the United States Patent to Tiedeman U.S. Pat. No. 2,635,770. Chain 41 is trained about an idler sprocket 43 journaled on the outer end of cutter arm 39 and on a drive sprocket 44 journaled around the inner sleeve 46.

As the cutter arm 39 rotates within the storage structure, the weight of the cutter arm is supported by a roller mounted on the undersurface of the cutter arm and adapted to ride on the upper surface of the foundation 3. As previously mentioned, the upper surface 36 of backbone 33 is flush with the floor plates 37 so that the roller can ride over the trough 6.

The mechanism for rotating the cutter arm 39 about the storage structure is similar to that described in the aforementioned U.S. Pat. No. 2,635,770. As best illustrated in FIG. 4, the center shaft 40 is journaled within a sleeve 46 mounted within housing 47 supported on the bottom surface of the trough 6. The lower end of the center shaft 40 carries a gear 48 which is driven by a pinion 49 secured to vertical shaft 50. In addition, to pinion 49, the shaft 50 carries a bevel gear 51 which is driven by bevel gear 52 on horizontal shaft 53. Shaft 53 is coupled to the inner end of a torque tube 54 that extends within the backbone 33 and the outer end of the torque tube is coupled to the output shaft 55 of a transmission 56 driven by motor 57 through a belt drive 58. The transmission 56 for the drive mechanism is a conventional type and provides a speed reduction from the motor 57 to the output shaft 55. The motor 57 is supported on a horizontal plate or platform 59 which in turn is secured to the vertical plate attached to the outer end of backbone section 35. With this drive system operating from motor 57 through torque tube 54, the cutter arm 39 is rotated slowly about the storage structure, generally at a rate of about 1 to 2 RPH.

To drive the cutter chain 39, a sleeve 60 is secured to the sprocket 44 and the lower end of the sleeve 60 carries a bevel gear 61 that is driven by bevel gear 62 attached to the inner end of shaft 63. The outer end of shaft 63 is coupled to the end of a torque tube 64 that extends within the backbone 33 and the outer end of torque tube 64 is connected to an output shaft 65 of transmission 56.

In accordance with the invention, an entry tool 66 is mounted for rotation on the inner end of backbone 33, and as the cutter arm assembly 8 is inserted within the trough 6, the entry tool 66 aids in dislodging the stored material within the trough and discharging it laterally to the augers 10.

As best shown in FIGS. 9-11, the entry tool 66 includes a hub 67 which is keyed to the end of horizontal shaft 68. An inner plate 69 extends outwardly from the hub 67, and an outer annular plate 70 having a central opening 71 is spaced forwardly of the plate 69. A series of circumferentially spaced spacers 72 connect the plates 69 and 70 and define a series of openings 73 in the periphery of the tool through which stored material can be discharged. A dome-like deflector 74 is connected generally centrally to the plate 69 and encloses the opening in hub 67. The dome-shape on the member 74 aids in deflecting the material radially outward toward the peripheral openings 73.

The outer surface of the plate 70 carries a series of radially extending cutting members 75. Each cutting member includes a pair of side plates 76 which converge radially and diverge axially in the direction of the periphery of entry tool 66. The inner ends of the plates 76 are spaced apart and are located adjacent the central opening 71 in plate 70, while an outer plate 77 connects the outer edges of plates 76. A central support 78 is located between the outer plate 77 and the plate 70.

The outer edge of each of the side plates 76 is provided with a series of generally diamond-shaped teeth 79, and similarly, the axially extending edge of each side plate is provided with a series of similar teeth 80. In addition to the teeth on the side plates 76, a series of large teeth 81 are welded to the plate 77 and extend at a shallow angle to the axis of the tool 66.

In addition to the cutting members 75, a series of small plates 82 are welded to the plate 70 and extend within the opening 71. The forward edge of each plate 82 is also provided with a series of diamond-shaped teeth 83.

As the cutter arm assembly 8 is installed within the structure, the tool 66 is rotated and the cutting members 75 penetrate and dislodge the stored material within the central portion of the trough and tend to throw the material laterally outward toward the augers 10. As the portion of the rotating tool 66 adjacent the axis of the tool has a lesser radial velocity than the outer periphery of the tool, the opening 71 is provided so that the material in the central area will be forced into the chamber between plates 69 and 70 and is then thrown outwardly by centrifugal force through the openings 73 to the augers 10. The cutting members 82 aid in cutting and forcing the material into the opening 71.

The size and shape of the cutting member and teeth on the entry tool 66 are designed to effectively dislodge and deflect the material laterally toward the augers 10 with a minimum power requirement.

In order to rotate the entry tool 66, the shaft 68 is journaled within an extension 84 of housing 47 and the end of the shaft 68 carries a gear 85 which is driven by a gear 86 carried by shaft 87. Shaft 87 extends horizontally through the housing 47 and is journaled within the housing walls. The outer end of shaft 87 is coupled to the inner end of a torque tube 88 that extends through the backbone 33 and the outer end of torque tube 88 is coupled to an output shaft 89 of transmission 56.

The transmission 56 which operates to rotate the torque tubes 54, 64 and 88, is mounted beneath plate 59 and is best illustrated in FIGS. 6-8. The input shaft 90 of the transmission 56 carries a pulley 91 that is driven from motor 57 through belt drive 58, and the input shaft 90 is journaled within the casing 92 of the transmission. The end of the shaft 90 carries a bevel gear 93 which drives a bevel gear 94 secured to the end of shaft 95 that is journaled for rotation within the spaced walls 96 of casing 92. To provide a variation in output speed, a sliding gear unit 97 is keyed to the shaft 95 and can be moved axially with respect to the shaft. Gear unit 97 includes three gears 98, 99 and 100 each of which has a different diameter and a different number of teeth. To move the gear unit 97 along the shaft 95 a yoke 101 is engaged with the gear 99 and the yoke can be moved through operation of handle 102 to thereby shift the gear unit 97 as desired along the shaft 95.

Gears 98, 99 and 100 of gear unit 97 are adapted to be selectively engaged with gears 103, 104 and 105 secured to the shaft 65. Shaft 65 is journaled in the casing 92 and as previously noted, the outer end of shaft 65 is coupled to the torque tube 64 which drives the cutter arm chain 41. By shifting the gear unit 97 along the shaft 95 to selectively engage one of the gears 98, 99 and 100 with gears 103, 104 and 105, the output speed of the shaft 65 and the speed of travel of the cutter chain 41 can be varied.

The shaft 65 is also connected through a drive system to the torque tube 54 to drive the cutter arm around the structure. In this regard a pinion 106 is secured to the end of shaft 65 and drives a gear 107 secured to shaft 108. In addition to gear 107, shaft 108 carries a pinion 109 which drives gear 110 on shaft 111. The shaft 111 extends outwardly of the casing 92 and operates through a ratchet mechanism 112, as described in the Teidemann patent 2,635,770, to drive the shaft 113. Shaft 113 lies directly beneath the shaft 65 and extends completely through the casing 92 of the transmission, with one end being connected to the torque tube 54 and the other end being connected to the ratchet mechanism 112, to provide the cutter arm 42 with intermittent rotational movement around the silo.

Rotation of the shaft 65 is also utilized to drive the entry tool 66. In this regard, a gear 114 is connected to shaft 65 and drives a gear 115 which is mounted for sliding movement on shaft 89 that is connected to torque tube 88. As shown in FIG. 6, the ends of shaft 89 are journaled in the casing 92 and wall 96, respectively, and shaft 89 is provided with a splined connection with gear 115 so that the gear 114 can move axially on the shaft 89. The sliding connection of gear 115 on shaft 89 enables the gear to be selectively engaged with the gear 114 to thereby drive the entry tool 66.

To move the gear 115 into and out of engagement with the gear 114 a yoke 116 is connected to the gear 115 and the yoke is carried on the end of a rod 117 which is mounted for sliding movement in bushing 118 in the wall 96. The opposite end of the rod 116 is connected by an offset connector 119 to a rack 120 which is driven by a pinion 121. Pinion 121 is secured to shaft 122 which is journaled within the casing 92. As best shown in FIG. 7, the outer end of shaft 122 is provided with a handle 123, and by rotating the handle 123, the pinion 121 carried by shaft 122 will move the rack 120 to thereby operate the yoke 116 to slide the gear 115 along shaft 89. With this construction the gear 115 can be moved into and out of engagement with gear 114 to thereby selectively operate the entry tool 66.

If the unloading unit is to be used for unloading free flowing material, the cutter arm assembly 8 is normally not installed until the material has been unloaded to a point where it has reached its angle of repose. At this time the central portion of the trough between the augers 10 will contain a substantial amount of the stored material. To install the cutter arm assembly 8, the door or closure which normally encloses the opening in the plate 19 is removed and the backbone 33 with the cutter arm 39 aligned above it is inserted through the opening and engaged with the undercut guide 124 in the trough. The under surface of the backbone 33 has a matching guideway which provides a dovetail type of alignment. At this time the motor 57 is operated and the handle 123 is moved to the engaged position so that the gear 115 will be engaged with gear 114 to thereby drive the entry tool 66. As the backbone 33 is moved within the trough 6, the entry tool 66 will engage the stored material within the trough and move the material laterally outward to the augers 10 where it will be conveyed to the exterior.

When the cutter arm assembly has been inserted to its proper position in which the entry tool 66 is located adjacent the inner end of the trough, the handle 123 can then be returned to the disengaged position, thereby moving gear 115 out of engagement with gear 114 and stopping operation of the entry tool. The cutter arm and the cutter chain can then be operated in the normal manner to dislodge the stored material and convey the dislodged material to the trough 6 where it will be conveyed by the augers 10 to the exterior of the structure.

The entry tool also has usefulness in installing the cutter arm assembly in a structure containing nonfree flowing material, such as silage, at the beginning of the unloading operation. The structure is normally filled with silage with the cutter arm assembly removed, and when it is desired to begin the unloading operation the cutter arm assembly 8 can be installed in the manner previously described with the entry tool 66 clearing the central portion of the trough 6 of silage as the cutter arm assembly is advanced within the trough.

Various modes of carrying out the invention are contemplated as being within the scope of the following claims particularly pointing out and distinctly claiming the subject matter which is regard as the invention.

We claim:

1. In combination with a sealed storage structure adapted to contain a stored material and having a trough extending in the foundation of the storage structure, an unloading mechanism comprising a conveyor unit disposed within the trough and operable to convey dislodged material within the trough to the exterior of the structure, a material dislodging assembly separate from the conveyor unit and including a frame disposed within the trough and extending generally parallel to the conveyor unit, said material dislodging assembly including a material dislodging member mounted for rotation with respect to the frame and disposed to rotate within the structure and dislodge the material and convey the dislodged material to the central portion of the trough, said material dislodging assembly being separately installed and removed from said structure, a power driven entry tool mounted on the inner end of the frame, said entry tool being operable to dislodge stored material from the trough when the frame is being installed within the trough and for moving the material laterally outward to said conveyor unit, first drive means for operating said conveyor unit, second drive means for operating said material dislodging member, and third drive means for operating said entry tool.

2. The apparatus of claim 1, wherein said entry tool includes a head disposed to rotate about a horizontal axis.

3. The apparatus of claim 2, wherein said head is provided with a series of cutting teeth.

4. The apparatus of claim 2, wherein said head includes an inner plate and an outer plate spaced from said inner plate to provide a chamber between, said outer plate being provided with a central opening establishing communication to said chamber, the peripheral surface of said head being provided with a series of second openings communicating with said chamber, and a series of cutting members mounted on the outer plate, a portion of the stored material within the trough being moved laterally outward by said cutting teeth and a second portion of the stored material passing through said first opening to said chamber and then being moved laterally outward through said second openings to the conveyor unit.

5. The apparatus of claim 4, wherein said conveyor unit comprises a pair of augers disposed in spaced parallel relation within said trough and said frame is located between said augers.

6. The apparatus of claim 1, wherein said second drive means and said third drive means are mounted on said material dislodging assembly.

7. The apparatus of claim 1, wherein said second drive means and said third drive means include a common source of power, and said apparatus includes means for selectively connecting said third drive means to said source of power.

8. In combination with a storage structure adapted to contain a stored material and having a trough extending in the foundation of the storage structure, an unloading mechanism comprising a pair of augers disposed in spaced parallel relation within the trough and operable to convey dislodged material within the trough to the exterior of the structure, a material dislodging assembly separate from the augers and including an elongated frame disposed within the trough between said augers, said material dislodging assembly including a material dislodging member mounted for rotation on the inner end of the frame and disposed to rotate within the structure and dislodge the stored material and convey the dislodged material to the central portion of the trough, a rotatable power driven entry tool mounted on the inner end of the frame and disposed to engage material located within the trough as the material dislodging assembly is installed within the structure and to move said material laterally outward to said augers.

9. The apparatus of claim 8, and including means for selectively operating said entry tool.

10. The apparatus of claim 8, and including a prime mover located outside of the structure, first drive means interconnecting the prime mover and said material dislodging member with a portion of said first drive means extending within said frame, second drive means interconnecting the prime mover with said entry tool with a portion of said second drive means extending within said frame, and clutch means for selectively connecting and disconnecting said second drive means and said prime mover.

11. The apparatus of claim 10, wherein said clutch means is located on the exterior of the structure.

12. The apparatus of claim 4, wherein said first opening is located axially of the head, and said inner plate is provided with a deflector member disposed in alignment with said first opening for deflecting said material laterally toward said second openings.

* * * * *